United States Patent [19]

Meyer

[11] Patent Number: 4,516,556

[45] Date of Patent: May 14, 1985

[54] FUEL PREHEATER

[75] Inventor: Howard E. Meyer, Slippery Rock, Pa.

[73] Assignee: Heat Exchange and Transfer, Inc., Pittsburgh, Pa.

[21] Appl. No.: 576,568

[22] Filed: Feb. 3, 1984

[51] Int. Cl.³ .......................................... F02M 31/00
[52] U.S. Cl. ................... 123/557; 123/552; 165/52
[58] Field of Search ................ 123/557, 552; 165/51, 165/52

[56] References Cited

U.S. PATENT DOCUMENTS

| | | | |
|---|---|---|---|
| 1,319,718 | 10/1919 | Martin | 123/557 |
| 1,447,640 | 3/1923 | Bernett | 123/557 |
| 2,175,126 | 10/1939 | McCormick | 123/557 |
| 3,951,124 | 4/1976 | Fairbanks | 123/557 |
| 3,986,486 | 10/1976 | Rabbiosi | 123/557 |
| 3,989,019 | 11/1976 | Brandt | 123/557 |
| 4,044,742 | 8/1977 | Linder | 123/557 |
| 4,099,501 | 7/1978 | Fairbanks | 123/557 |
| 4,146,002 | 3/1979 | Quinn | 123/557 |
| 4,259,937 | 4/1981 | Elliott | 123/557 |
| 4,303,051 | 12/1981 | Weishaar | 123/557 |
| 4,318,384 | 3/1982 | Moffett | 123/557 |
| 4,342,303 | 8/1982 | McCord | 123/557 |
| 4,393,851 | 7/1983 | Gorans | 123/557 |
| 4,397,288 | 8/1983 | Kelling | 123/557 |
| 4,403,590 | 9/1981 | Davis | 123/557 |

FOREIGN PATENT DOCUMENTS

| | | | |
|---|---|---|---|
| 975638 | 10/1975 | Canada | 123/557 |
| 972864 | 2/1951 | France | 123/557 |
| 8005847 | 5/1982 | Netherlands | 123/557 |

Primary Examiner—Ronald H. Lazarus
Attorney, Agent, or Firm—Carothers & Carothers

[57] ABSTRACT

A fuel preheating apparatus and method for use in conjunction with an internal combustion engine including a preheater wherein a flow of fuel to be heated is maintained in juxtaposition to a pair of selectively operable heat sources, one of which is a flow of engine coolant. An additional heat source is provided to heat the flow of engine coolant through the preheater to thereby provide engine block warming during extended periods of engine shutdown.

10 Claims, 3 Drawing Figures

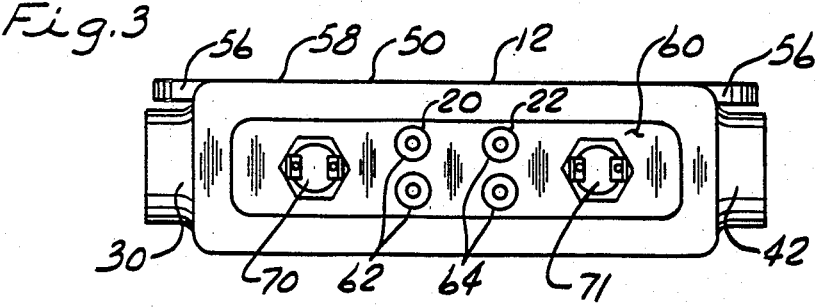
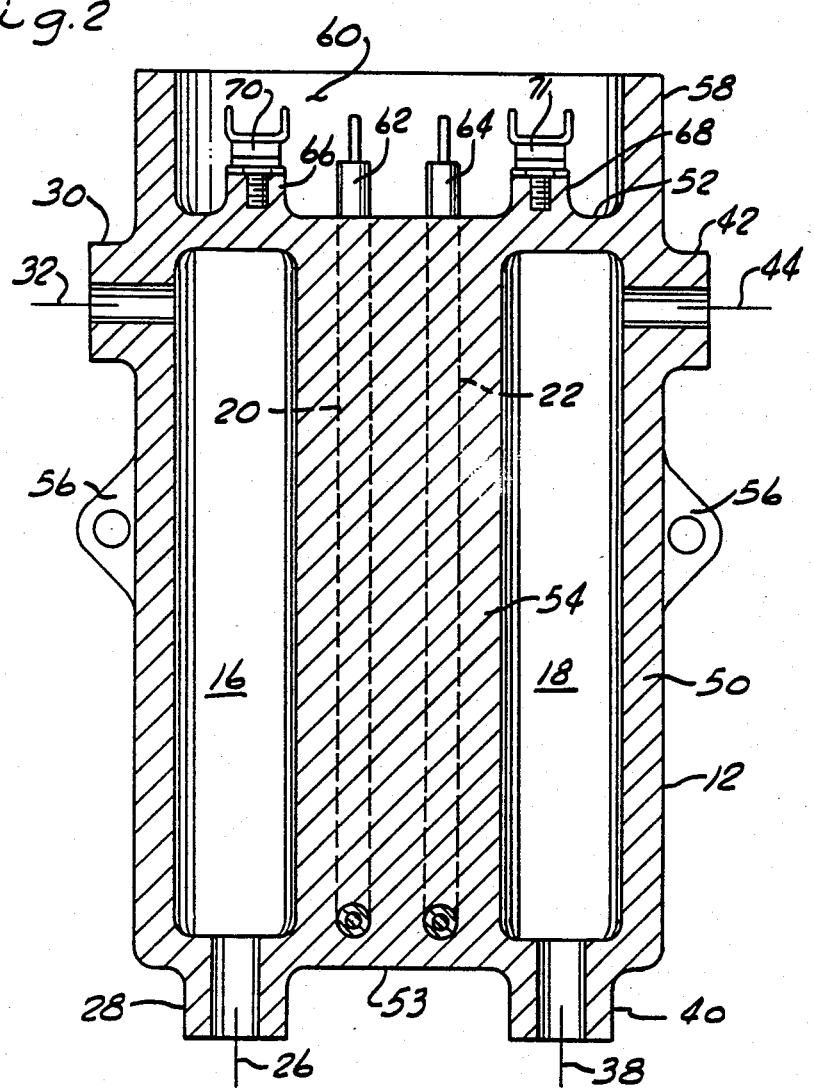

FUEL PREHEATER

In the automotive arts it is well known to provide certain types of internal combustion engines, diesel engines for example, with fuel preheaters to elevate the fuel temperature prior to injection of the fuel into the engine cylinders. Such preheaters have often been electrical resistance heaters, for example, and proper operation of diesel engines has often been impossible without the use of such fuel preheaters, particularly in cold operating environments.

Also well known are engine block heaters for preheating an internal combustion engine block prior to engine startup. Such block preheaters have also often been electric resistance heaters which heat the engine coolant and by spontaneous thermal currents slowly circulate it through the engine block. Diesel engines in particular require block preheating in cold operating environments to facilitate easy startup from a cold condition.

In some prior electric resistance type fuel preheaters an electric resistance heating element directly contacts the flow of fuel as it passes through the fuel line to the engine. Direct fuel contact with the heating element can result in overheating of the fuel or non-uniform heating of the fuel flow. The fuel contacting the heating element may tend to carbonize within the flow path thus producing particles which can flow with the fuel stream and clog the fuel filter. Fuel which carbonizes on the heating element forms a thermal insulation barrier which reduces heat input to the fuel from the heating element, increases the temperature gradient from the heating element to the fuel for a given energy transfer rate, and may result in heating element burnout.

The present invention provides for an improved fuel preheater which overcomes the above and other disadvantages of the prior art and in addition offers in a single unit benefits of a fuel preheater and an engine block preheater wherein fuel flow may be preheated by transfer of thermal energy from the engine coolant to the fuel flow via a heat exchange interface therebetween.

The invention preferably provides an electrically powered engine block and fuel preheater which is operable to provide uniform, coordinated preheating of fuel and engine coolant with a minimum of energy waste through use of a pair of electric resistance heating elements, one for each of the two described preheating functions. The two heating elements are cast in place in the cast metal body of the preheater structure, which body has defined therein cavities through which the fuel and coolant to be preheated flows.

The preheater body structure provides a heat transfer interface whereby heat from the engine coolant is transferred to the fuel flow for preheating thereof in normal operation.

It is therefore one object of the invention to provide a new and improved fuel preheater for an internal combustion engine.

Another object of the invention is to provide an improved fuel preheater having the heating elements cast in place in a relatively massive body member to promote uniform heat distribution.

Yet another object of the invention is to provide a new and improved combined fuel and coolant preheater apparatus.

Still another object of the invention is to provide a fuel preheater having new and improved control means for controlling the operation of a fuel preheater.

Still another object of the invention is to provide a fuel preheater having new and improved control means for controlling the operation of a fuel preheater.

Other objects and advantages appear in the following description and claims.

The accompanying drawings show, for the purpose of exemplification without limiting the invention or the claims thereto, certain practical embodiments illustrating the principles of this invention wherein:

FIG. 2 is a sectioned side elevation of a preheater of the present invention; and FIG. 3 is a top plan view of the preheater of FIG. 2.

Figure 1:
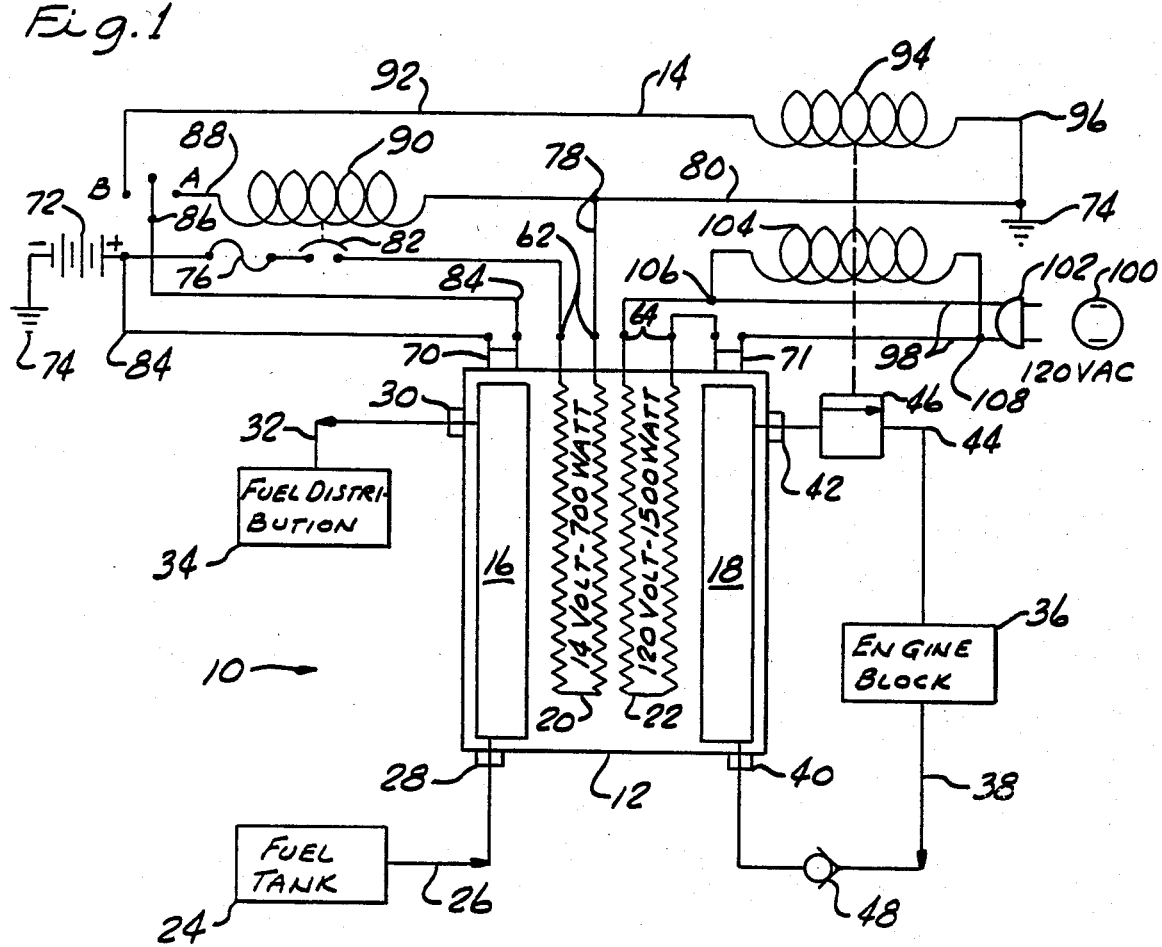
FIG. 1 is a schematic depiction of a fuel preheater and control system of the present invention.

There is generally indicated at 10 in FIG. 1 a preheater system for an internal combustion engine according to one presently preferred embodiment of the instant invention and including a preheater body 12 and electrical control circuitry 14 for control of the preheater system 10. As shown, body 12 includes fuel and coolant flow cavities 16, 18 and respective electric resistance heating elements 20, 22. In operation, fuel flows from fuel tank 24 via a fuel line 26 to an inlet 28 and into cavity 16 where it is preheated. The heated fuel then flows via an outlet 30 connected to a fuel line 32 to the engine fuel distribution system 34.

For warming of engine block 36, engine coolant circulates from engine block 36 via a coolant line 38 and a one way check valve 48 to an inlet 40 into cavity 18 where it is preheated. A thermal current of the heated coolant then flows via an outlet 42 and a connected coolant return line 44 back to engine block 36. A solenoid operated valve 46 is selectively operable to close and open the coolant preheat loop to coolant flow therethrough. The one way check valve 48 permits coolant flow only in the direction described above and shown in FIG. 1 within the coolant loop.

Referring to FIGS. 2 and 3, preheater body 12 is preferably formed as a generally rectangular structure, such as a silicon brass casting, for example, to provide a preheater body of high thermal conductivity and of sufficient mass to act as a heat sink. As an alternative, body 12 may be a zinc die casting.

The body 12 comprises a hollow peripheral side wall structure 50 and end wall portions 52, 53 which are joined together by peripheral wall portion 50. A longitudinally extending intermediate wall portion 54 extends between end wall portions 52, 53, and the cavities 16, 18 are formed within the confines of wall portions 50, 52, and 53 on opposite sides of intermediate wall portion 54.

Also formed integrally with end wall portion 53 and peripheral wall 50 are the fuel preheat cavity inlet 28 and outlet 30, and coolant heating cavity inlet 40 and outlet 42, as described hereinabove, and each of which is suitably formed for leak tight connection to, respectively, fuel lines 26, 32 and coolant lines 38, 44.

Body 12 may be provided with any suitable mounting means such as integrally formed mounting lugs 56 for mounting thereof within the engine compartment of a vehicle.

The end wall portion 52 defines the bottom of a recess 60 which is formed by an outward extension 58 of peripheral wall portion 50. Within recess 60 all electrical connections to preheater body 12 are made. Accordingly, heating elements 20, 22 are cast in place in intermediate wall portion 54 adjacent to but physically isolated from respective cavities 16, 18, and terminal or connector end portions 62, 64 of the respective heating elements 20, 22 protrude beyond end wall 52 within recess 60 for connection to power supply circuitry which will be described presently. On the exterior of end wall portion 52 there are two formed integral studs 66, 68 adjacent to the respective cavities 16, 18. Each stud 66, 68 is taped to receive a stud-mounted thermostat 70, 71 respectively, such as a Therm-o-disc brand thermostat, for example.

Recess 60 is filled with any suitable potting compound, polyurethane for example, to seal the electrical connections and components therein from fouling by moisture and other contaminants and to ensure mechanical and electrical integrity of the electrical connections in the harsh environment of a vehicle engine compartment. Because the heating elements (element 20 in particular) are cast in place in thermally conductive material, high watt density heating elements may be utilized. For example a watt density of 80 watts pre square inch has been found suitable. The specification of a high watt density depends in part upon the design, mass and thermal conductivity of the body 12, and is suitable in part because the heating elements are cast in place within body 12 and do not directly contact the fuel and coolant flow passing through respective cavities 16 and 18. The body 12 encapsulates the heating elements and acts as a heat sink to conduct heat from the heating elements to the respective portions of body 12 within which cavities 16 and 18 are formed. The interior surface area of each cavity 16, 18 is relatively large compared to the surface area of the respective heating element 20, 22 approximately 32 square inches for cavity 16 for example. Thus the heat output from heating element 20 is transferred to the fuel flow within cavity 16 over a relatively large surface area. Accordingly, more efficient heat transfer to the fuel flow is achieved at higher energy transfer rates without any carbonizing of fuel or other undesirable effects.

The electrical circuitry 14 which controls preheating apparatus 10 preferably includes the vehicle battery 72, a 12 volt battery for example, with the negative terminal thereof connected to ground 74. The positive terminal of battery 72 provides power via a fused conductor 76 to one terminal 62 of heating element 20, which may be a 14 bolt, 700 watt resistance type heating element for example. The other terminal 62 of heating element 20 is connected via conductors 78 and 80 to ground 74. Normally open, solenoid operated switch contacts 82 are operable to selectively open and close the power circuit for heating element 20 in a manner to be described presently.

Also connected to the positive terminal of battery 72 is a conductor 84 which is connected, via thermostat 70, to a manual selector switch 86 which preferably is mounted in the vehicle cab. The thermostat 70 operates to selectively supply or interrupt power to switch 86. For example, thermostat 70 may be a 5 amp, 80° F. unit which opens and thereby interrupts power to switch 86 when the temperature of fuel within cavity 16 exceeds 80° F.

Switch 86 is manually operable to select a center or neutral position as shown in FIG. 1, or either of two operating positions, A and B. In position A switch 86 provides power from battery 72 via a conductor 88 to a solenoid coil 90. The opposite pole of coil 90 is connected by conductor 80 to ground 74. Coil 90 serves to operate contacts 82 to supply or interrupt power to heating element 20. Accordingly, when switch 85 is in position A, coil 90 is energized to maintain contacts 82 closed and power is thus supplied to heating element 20 to preheat fuel flow passing through cavity 16 so long as the fuel temperature does not exceed 80° F. If the fuel temperature should exceed 80° F., thermostat 70 will open to interrupt the power supply to coil 90, and contacts 82 thus will open to de-energize heating element 20.

In the B position, switch 86 provides power from battery 72 via a conductor 92 to one pole of a solenoid coil 94, the opposite pole of which is connected via a conductor 96 to ground 74. Solenoid coil 94 operates the normally closed solenoid valve 46 to selectively open and close the valve 46 for coolant flow from engine block 36 through cavity 18 as described hereinabove. It will thus be seen that switch 86 is operable to select between a pair of available fuel preheating heat sources. Accordingly, only one of the two heat sources (i.e. heating element 20 or hot engine coolant flowing within cavity 18) may be operative to preheat the fuel at any given time, and operation of either will be interrupted by thermostat 70 whenever the fuel temperature exceeds the pre-selected set point temperature of thermostat 70.

The circuitry 14 also provides a means for supplying power to heating element 22. Specifically, one terminal 64 of heating element 22, which may be a 120 volt, 1500 watt resistance type heating element for example, is series connected with one terminal of thermostat 71, a 25 amp, 180° F. unit for example. The remaining terminals of heating element 22 and thermostat 71 are connected via respective conductors 98 to a standard plug 102 which may be plugged into a standard 120 VAC wall outlet 100. Thermostat 72 thus opens to interrupt power to heating element 22 when the temperature of coolant in cavity 18 exceeds 180° F. A 120 VAC solenoid coil 104 connected across conductors 98 as at 106, 108 provides for operation of solenoid valve 46 independently of solenoid coil 94 to open valve 46 whenever 120 VAC power is available in conductors 98 for energizing heating element 22. Accordingly, in those conditions which warrant use of engine block preheating the plug 102 may be connected to an outlet 100 to provide for heating of engine coolant within cavity 18 and consequent warming of the engine block through continuous thermal circulation of the heated coolant via conduits 44, 38 through the engine block 36.

From the description hereinabove it will be seen that the present invention provides for a novel and improved means of fuel preheating in an internal combustion engine wherein the heat source for fuel preheating may be either an electric heating element (for use upon startup when the engine is cold) or a flow of hot engine coolant (for use after engine warmup) whereby thermal energy is conducted via wall portion 54 to preheat fuel flowing through cavity 16. The invention also provides for independent engine block warming during such conditions as overnight stops in very cold weather.

A presently preferred embodiment of the invention having been described hereinabove, it is to be appreciated that the invention may be practiced in various alternative embodiments with numerous modifications thereto without departing from the essence of the invention. For example, the specifications of heating elements 20 and 22 may be varied with a wide latitude of design possibilities; in particular, heating element 22 may be a 240 volt element and the power circuit therefor may be suitably adapted to be powered by 240 VAC; an indicator light or other means may be provided to indicate when switch 86 is in one of the operative positions; alternatively or in addition, the switch 86 may be wired through the vehicle ignition switch to ensure that if switch 86 is left in an operative position with the engine stopped, the battery will not be drained.

These and other embodiments and modifications having been envisioned and anticipated by the inventor, the invention is to be construed as broadly as permitted by the scope of the claims appended hereto.

I claim:

1. In a preheater system for use in conjunction with an internal combustion engine, the combination comprising:

a preheater body member;

a fuel flow conducting channel defined within said body member and adapted to have a flow of fuel passed continuously therethrough;

a pair of selectively operable heat sources associated with said body member in heat exchange relationship with said fuel flow conducting channel for supplying energy to heat such a flow of fuel;

at least one of said pair of heat sources including an engine block coolant flow conducting channel formed within said body member and adapted to sustain a continuous flow of engine coolant therethrough for recirculation of such engine coolant through said coolant flow conducting channel and the engine block;

selectively operable control means for selecting operation of one of said pair of heat sources to supply energy for preheating said flow of fuel said pair of heat sources, including the engine coolant flow conducting channel, being located in a manner that the body member provides for heat transfer from said pair of heat sources to the flow of fuel passing through said fuel flow conducting channel, a selectively operable additional heater means carried by said body member for heating the flow of engine coolant within said engine coolant flow conducting channel, and a thermostatic control for limiting the heat input from said selectively operable additional heater means according to a preselected maximum temperature for said engine coolant.

2. The combination as claimed in claim 1 wherein the other of said pair of heat sources includes an electric resistance heating element carried by said body member.

3. The combination as claimed in claim 1 wherein said control means includes a thermostatic control for limiting the heat input from either of said pair of heat sources according to a preselected maximum temperature for the flow of fuel passing through said fuel flow conducting channel.

4. The combination as claimed in claim 1 wherein said body member is a casting of thermally conductive material.

5. The combination as claimed in claim 4 wherein said thermally conductive material is bronze.

6. In a preheater system for use in conjunction with an internal combustion engine, the combination comprising:

a thermally conductive body member;

a fuel flow path defined within said body member and including a fuel preheating cavity for preheating of fuel flow prior to combustion thereof by the engine;

a fuel heating element carried by said body member in heat exchange relationship with the fuel flowing within said fuel preheating cavity;

an engine coolant flow channel defined within said body member in heat exchange relationship with the fuel flowing within said fuel preheating cavity and adapted to sustain a continuous recirculating flow of engine coolant therethrough from and to the engine block for preheating the fuel flowing within said fuel preheating cavity;

a value means which is operable to selectively provide an open or closed coolant flow path between said coolant flow channel and the engine block;

control means cooperable with a power source to selectively energize said heating element or to actuate said valve to provide an open coolant flow path for recirculating coolant flow through said engine coolant flow channel whenever the temperature of the fuel within said fuel preheating cavity is below a predetermined temperature;

a coolant heating element carried by said body member in heat exchange relationship with said engine coolant flow channel; and circuit means cooperable with a power source to energize said coolant heating element and to actuate said valve to thereby permit recirculating of engine coolant within said flow channel whereby a thermal current of heated coolant flow may be sustained in a flow loop including said coolant flow channel and the engine block to warm the engine block prior to engine startup.

7. The preheater system as claimed in claim 6 wherein said control means includes solenoid operated power contacts for selectively supplying energizing power to said heating element, and circuit means for selectively supplying actuating power to actuate said power contacts or said valve.

8. The preheater system as claimed in claim 7 wherein said circuit means includes a manually operable switch for selectively supplying actuating power from such a power source to actuate said power contacts or said valve.

9. The preheater system as claimed in claim 8 wherein said circuit means additionally includes a theremostatic switch for permitting the selective actuation of said power contacts or said valve only when the temperature of fuel within said preheating cavity is below said preselected temperature.

10. The preheater system as claimed in claim 6 wherein the surface area of said fuel preheating cavity is substantially larger than the surface area of said fuel heating element.

* * * * *